(12) United States Patent
Ma et al.

(10) Patent No.: US 6,542,671 B1
(45) Date of Patent: Apr. 1, 2003

(54) INTEGRATED 3-DIMENSIONAL MULTI-LAYER THIN-FILM OPTICAL COUPLERS AND ATTENUATORS

(75) Inventors: Abraham C. Ma, Fremont, CA (US); Tzu-Yih Chu, San Jose, CA (US)

(73) Assignee: Super Light Wave Corp., San Jose, CA (US)

( * ) Notice: Subject to any disclaimer, the term of this patent is extended or adjusted under 35 U.S.C. 154(b) by 0 days.

(21) Appl. No.: 09/683,306

(22) Filed: Dec. 12, 2001

(51) Int. Cl.$^7$ .................................................. G02B 6/26
(52) U.S. Cl. ............................. 385/47; 385/14; 385/132
(58) Field of Search ............................. 385/47, 14, 132

(56) References Cited

U.S. PATENT DOCUMENTS

| | | | |
|---|---|---|---|
| 3,970,360 A | 7/1976 | Kersten et al. ............... | 350/96 |
| 4,006,964 A | 2/1977 | Mahlein et al. ............... | 350/96 |
| 4,842,357 A * | 6/1989 | Doneen ........................ | 385/12 |
| 4,958,897 A | 9/1990 | Yanagawa et al. ........ | 350/96.15 |
| 5,059,475 A | 10/1991 | Sun et al. ..................... | 428/195 |
| 5,109,468 A | 4/1992 | Tamulevich et al. ........ | 385/140 |
| 5,157,746 A | 10/1992 | Tobita et al. ................. | 385/33 |
| 5,206,920 A | 4/1993 | Cremer et al. ................ | 385/37 |
| 5,225,942 A | 7/1993 | Ikeno ......................... | 359/836 |
| 5,303,319 A | 4/1994 | Ford et al. ................... | 385/131 |
| 5,325,459 A | 6/1994 | Schmidt ...................... | 385/140 |
| 5,745,271 A | 4/1998 | Ford et al. ................... | 359/130 |
| 5,838,854 A | 11/1998 | Taneya et al. ............... | 385/50 |
| 5,841,929 A | 11/1998 | Komatsu et al. ............ | 385/129 |
| 5,881,199 A | 3/1999 | Li ............................... | 385/140 |
| 5,894,535 A * | 4/1999 | Lemoff et al. ................ | 385/47 |
| 5,915,063 A | 6/1999 | Colbourne et al. .......... | 385/140 |
| 5,917,980 A * | 6/1999 | Yoshimura et al. ......... | 385/129 |
| 5,966,493 A | 10/1999 | Wagoner et al. ............ | 385/140 |
| 6,097,874 A | 8/2000 | Yunoki ........................ | 385/140 |
| 6,108,472 A | 8/2000 | Rickman et al. .............. | 385/48 |
| 6,134,358 A | 10/2000 | Wu et al. ...................... | 385/16 |
| 6,157,475 A | 12/2000 | Dugan et al. ................ | 359/110 |
| 6,208,798 B1 | 3/2001 | Morozov et al. ............ | 385/140 |

* cited by examiner

Primary Examiner—Hung N. Ngo
(74) Attorney, Agent, or Firm—Stuart T. Auvinen

(57) ABSTRACT

An integrated optical device has two waveguide layers that are patterned to provide 2-dimensional interconnected networks of waveguides. A filter layer between the two waveguide layers is made by sputter deposition of thin films with alternating indexes of refraction. Light traveling vertically through the filter layer experiences an interferometric effect. A deflecting bump is formed in the plane of the lower waveguide layer. The bump is isotropicly etched, undercutting a photo-mask over the bump, producing a rounded, concave profile to the bump. High-index material is deposited over the bump and patterned to form a waveguide that has light deflected by the bump upward. The filter is formed over the bump to receive the deflected light. The filter reflects some light back down to the bump to another waveguide in the first layer. Light transmitted vertically up through the filter is bent to the horizontal plane of the upper waveguide layer.

20 Claims, 15 Drawing Sheets

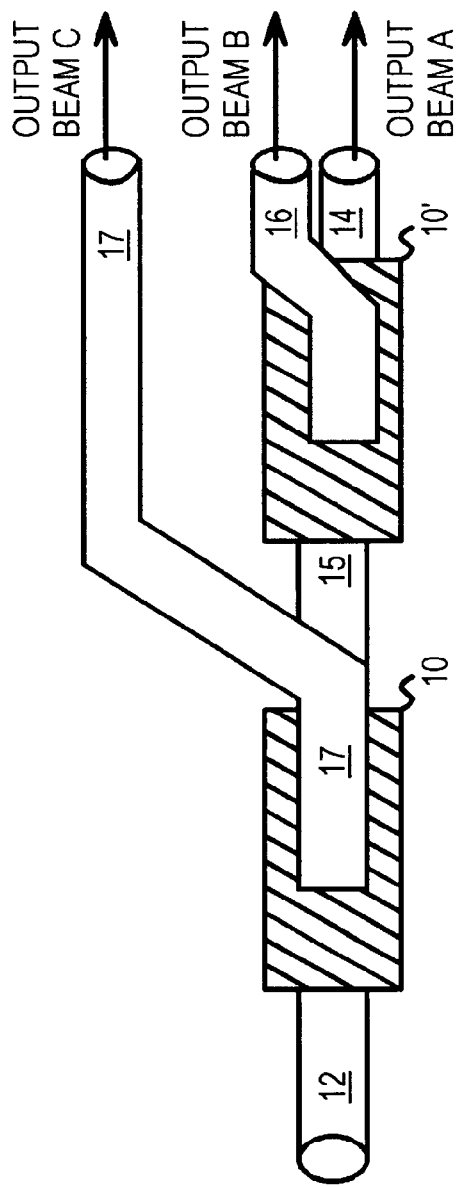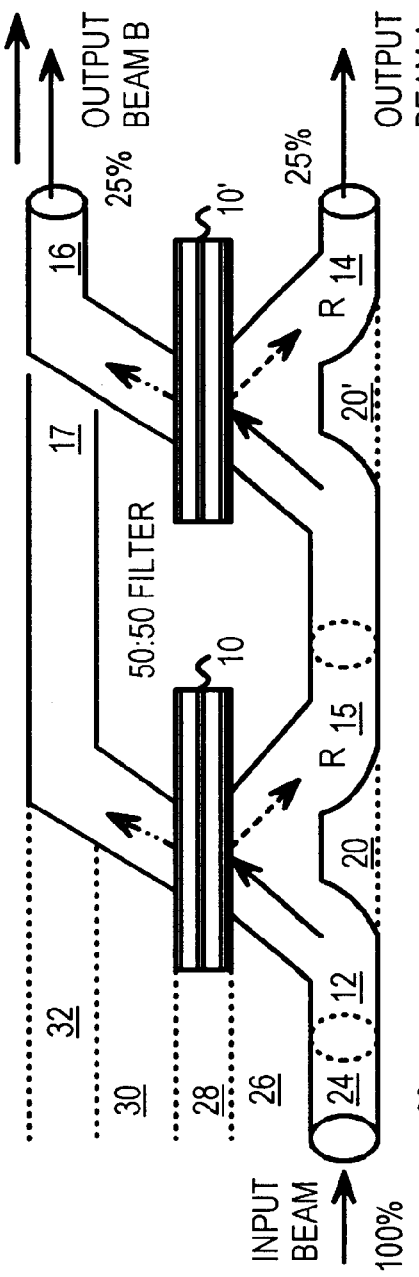
FIG. 6B TOP VIEW
FIG. 6A SIDE VIEW

INTEGRATED 3-DIMENSIONAL MULTI-LAYER THIN-FILM OPTICAL COUPLERS AND ATTENUATORS

BACKGROUND OF THE INVENTION

This invention relates to optical systems, and more particularly to integrated optical devices manufactured using a three-dimensional multi-layer technology.

Rapid, substantial improvements in telecommunications and networking have been made possible by advances in optical technology or photonics. A variety of optical devices are used to multiplex and de-multiplex optical signals onto fiber optic lines. Logical operations can also be performed using optical rather than electrical signals, although optical signal are often converted to electrical signals.

Splicing two optical fibers together provide a simple type of optical coupler that is still widely used. More complex optical couplers and attenuators have been made by a variety of methods. Usually these optical devices are not integrated with other optical devices, or are integrated with only a few other optical components. Optical technology is limited by a relatively low level of integration when compared to electronic devices with millions of integrated transistors.

Some optical devices may contain an optical waveguide formed by a layer of high-refractive-index material that is sandwiched between upper and lower layers of low-index material. The light is restricted to traveling in wave-guides formed in the high-index layer. However, this mostly-planar structure may not allow for cross-over of one waveguide by another. Light generally travels within the two dimensions of the sandwiched optical-guide layer.

Other components such as filters may be desirable, but are typically not integrated with the waveguides on the same substrate. Some type of hybrid, thick-film multi-substrate structure may be used which is much larger than an integrated, thin-film structure on one substrate.

What is desired is an integrated optical device, such as an optical power coupler or attenuator. An optical device formed by many layers of thin films on a single substrate is desirable. Waveguides formed by the thin films are desired to be integrated with optical filters that are also formed by the thin films integrated on the same substrate. A three-dimensional multi-layer optical device structure is desirable.

BRIEF DESCRIPTION OF DRAWINGS

FIGS. 6A–B show an integrated optical power coupler that uses two waveguide layers and one filter layer.

DETAILED DESCRIPTION

The present invention relates to an improvement in integrated optical devices. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

Figure 1:
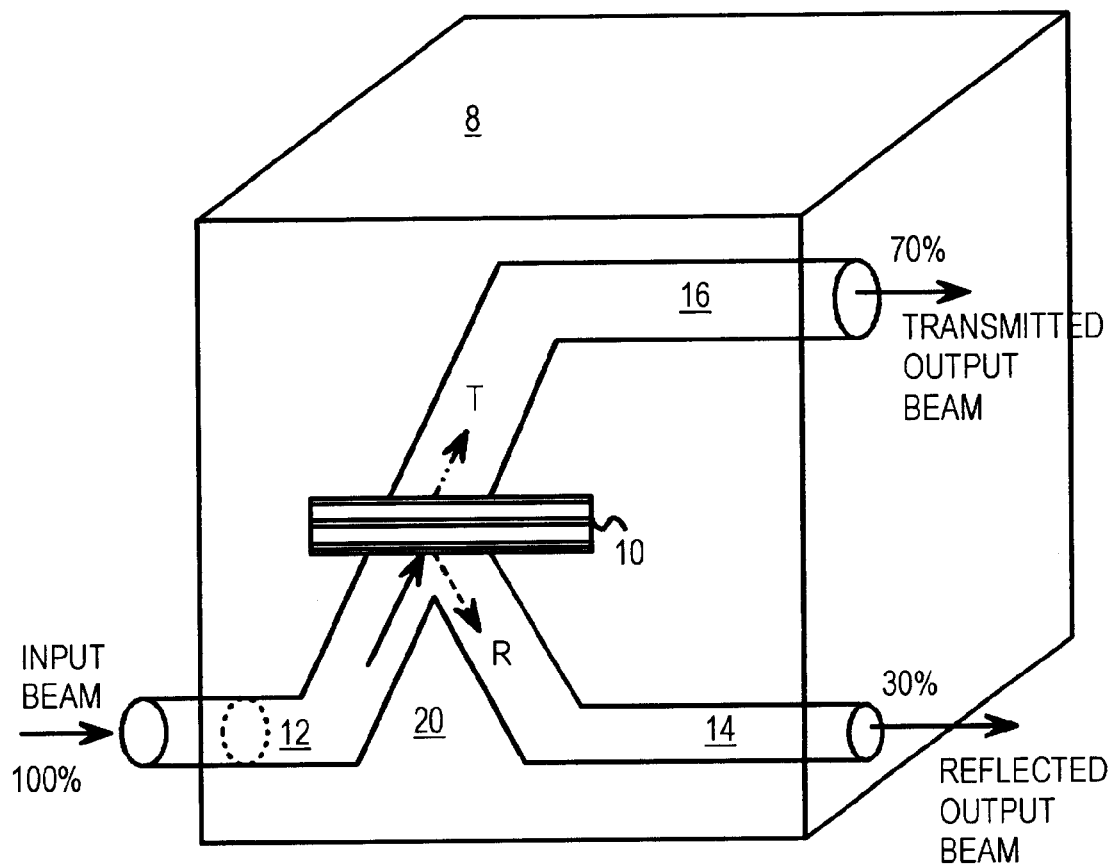
FIG. 1 is a simplified diagram of an integrated optical coupler formed by several thin-film layers on a substrate.

FIG. 1 is a simplified diagram of an integrated optical coupler formed by several thin-film layers on a substrate. Integrated device 8 is formed by depositing and etching thin films on a substrate. Input waveguide 12 and reflected-output waveguide 14 are formed on a first layer of high-refractive index material that has layers of low-index material above and below. Likewise, transmitted-output waveguide 16 is formed by another, upper layer of high-index material that has a low-index layer immediately below it and another low-index layer immediately above it.

Bump 20 is formed of a low-index layer that is deposited as a layer and then etched to form bump 20. Bump 20 blocks light traveling along the high-index layer from input waveguide 12 that would otherwise continue in the plane toward reflected-output waveguide 14. Bump 20 is etched so that it has a profile that bends light from input waveguide 12 upward, out of the plane of the high-index layer that forms waveguides 12, 14.

The light from input waveguide 12 that is bent upward by bump 20 impinges upon optical filter 10. Optical filter 10 is formed above bump 20 and above the high-index layer that forms waveguide 12, 14. Some of the light bent upward by bump 20 is reflected off the lower surface or reflected by intermediate layers of filter 10 and is collected by reflected-output waveguide 14. The right side of bump 20 acts to bend the reflected light back into the plane of reflected-output waveguide 14.

Filter 10 is formed by a stack of alternating high and low refractive index thin-film layers. Each layer has a thickness on the same order as the optical wavelength. The layer thicknesses can be chosen for a target range of wavelengths. Constructive and destructive interference occurs, so these layers act as an interferometer, reflecting some of the optical power back to reflected-output waveguide 14, while allowing some optical power to pass upward through filter 10 to transmitted-output waveguide 16.

Some light is transmitted upward through filter 10, and becomes the transmitted beam that is collected by transmitted-output waveguide 16. In this example, filter 10 is a 70%–30% filter that transmits 70% of the input optical power at the target wavelength, such as 1510 nm to 1590 nm. Filter 10 reflects the remaining 30% of the input optical power to reflected-output waveguide 14.

Almost no optical power is absorbed by filter 10 since the films can be of high quality when deposited by ion-beam sputtering or other ultra-pure methods. Filter 10 does not heat up appreciably as very little power is absorbed.

Figure 2:
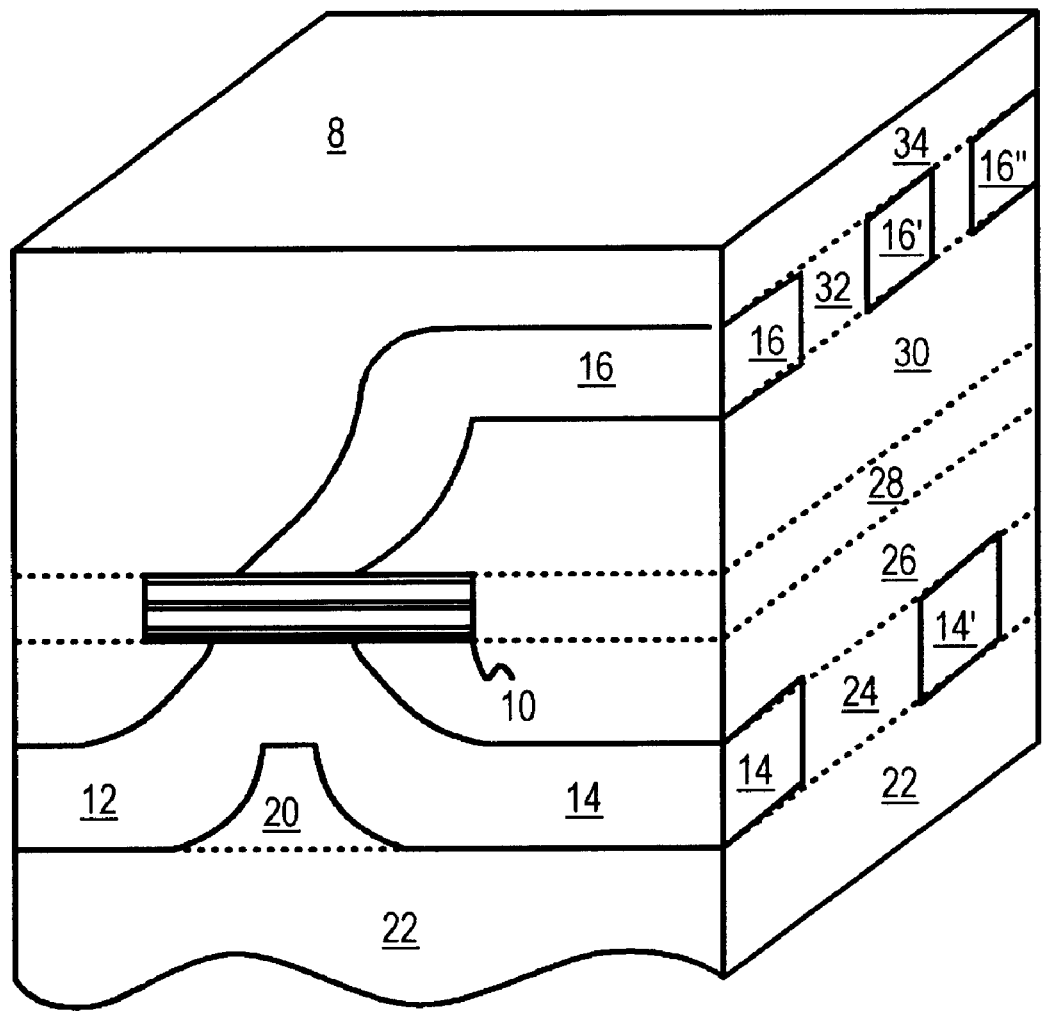
FIG. 2 is a more detailed diagram showing a cross-section of an integrated optical coupler.

FIG. 2 is a more detailed diagram showing a cross-section of an integrated optical coupler. Integrated device 8 may include several optical power couplers besides the one shown. Lower-layer waveguide 14' and upper-level waveguides 16', 16" are other waveguides that may be part of such other optical devices that are integrated onto the same substrate 22.

Substrate 22 is typically much thicker than the layers deposited on its surface. The diagram shows only the portion of substrate 22 near the surface for simplicity. Substrate 22 may itself be of low-index material, or a separate first layer (not shown) of low-index material may be deposited or grown on the surface of substrate 22.

Bump 20 is formed of low-index material that is deposited onto the top surface of substrate 22 and masked and etched to produce a small island of low-index material. Lower waveguide layer 24 is then deposited over substrate 22 and bump 20, then masked and etched to forms input waveguide 12 and reflected-output waveguide 14.

Low-index layer 26 is deposited over the patterned lower waveguide layer 24 to form a top boundary to the waveguides in layer 24. Planarization etching exposes lower waveguide layer 24 where it rises over bump 20. Alternating layers of high and low index material are then deposited on this exposed opening to lower waveguide layer 24 as filter layer 28. Masking and etching forms filter 10 in filter layer 28.

Another low-index layer 30 is deposited, masked, and etched to form the lower surface of transmitted-output waveguide 16. High-index material is deposited as upper waveguide layer 32. Masking and etching form transmitted-output waveguide 16, and other upper-level waveguides 16', 16". Top low-index layer 34 is then deposited over the tops and sides of waveguides 16, 16', 16".

Isotropic Etching Produces Rounder Profile for Bump 20

Bump 20 can have the concave profile shown when the etching step is carefully designed and controlled. Using a wet etch often produces an isotropic etch profile while using a dry plasma etch produces an anisotropic profile, especially when ion-beams are used. Higher pressure of the plasma in the low-pressure etching chamber can increase the degree of isotropic etching, while lower pressures and higher ion energies can increase anisotropic etching.

For example, isotropic etching cuts both vertically and horizontally at about the same rate. Anisotropic etching cuts vertically much more quickly than horizontally and produces a much steeper profile than does isotropic etching. Control of the etching conditions can vary the profile between the extremes produced by pure isotropic and pure anisotropic etching. Bump 20 is preferably produced using a more isotropic etching process so that the profile slope gradually curves toward the horizontal input waveguide 12. The rounder profile of bump 20 thus produced helps to bend the input light from input waveguide 12 upward to filter 10. Isotropic etching can reduce or eliminate sharp edges or steps, which could scatter or reflect light backwards.

Process Steps—FIG. 3

Figure 3A:
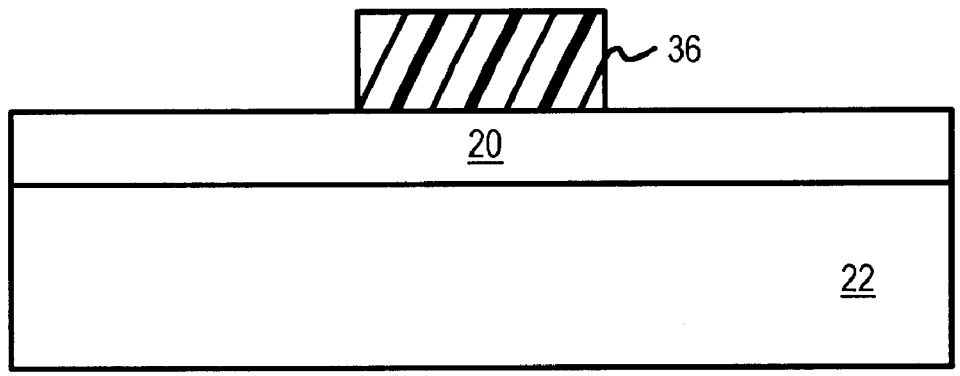
FIGS. 3A–T show cross-section diagrams of the integrated optical device at various steps in the manufacturing process.
Figure 3B:
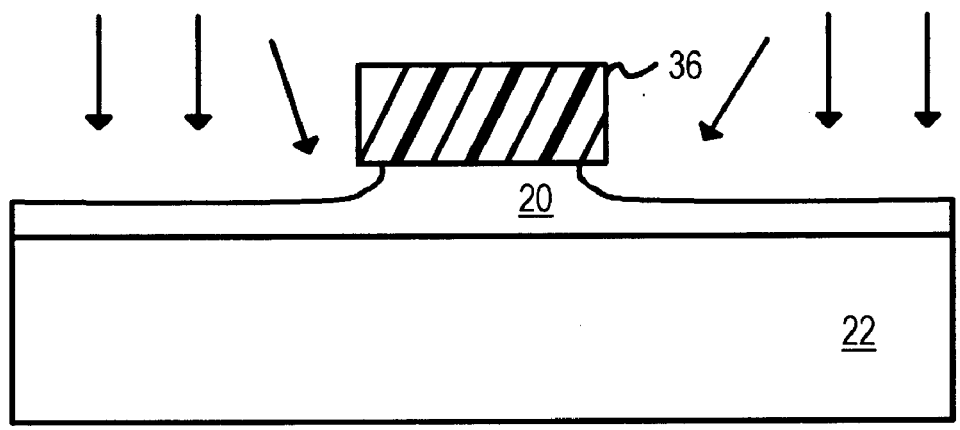
Figure 3C:
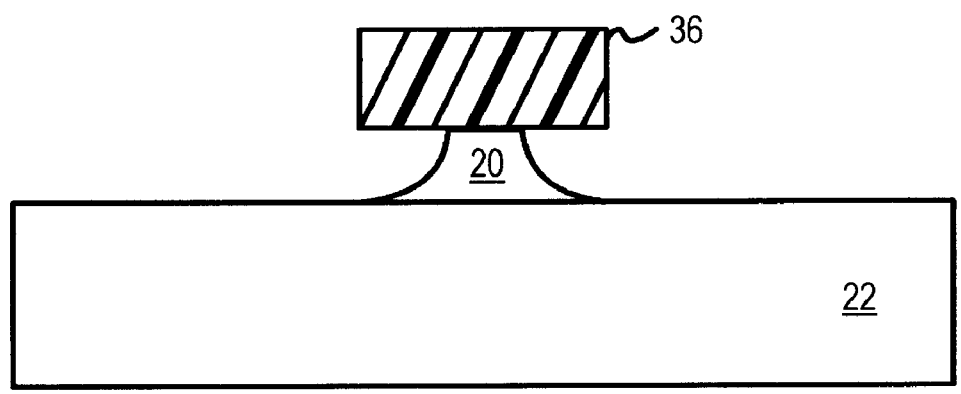
Figure 3D:
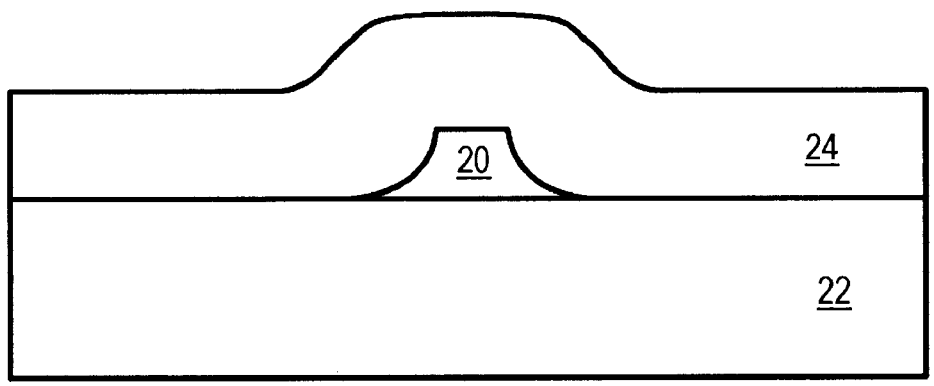
Figure 3E:
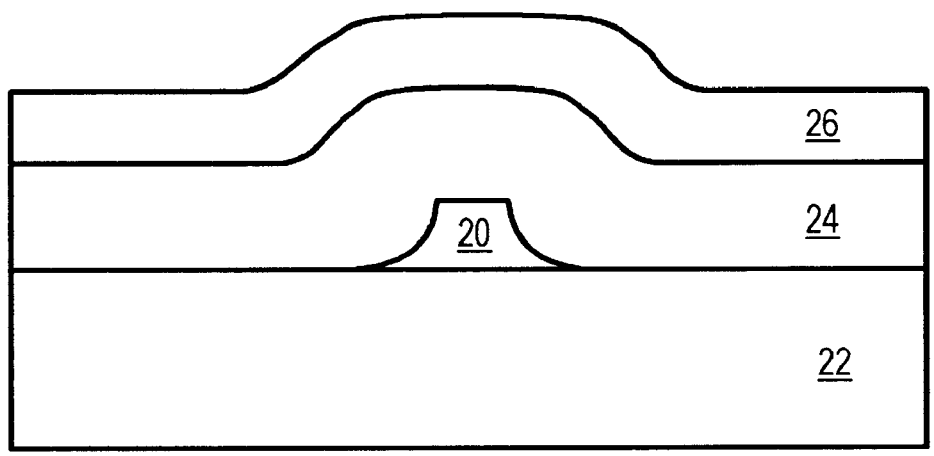
Figure 3F:
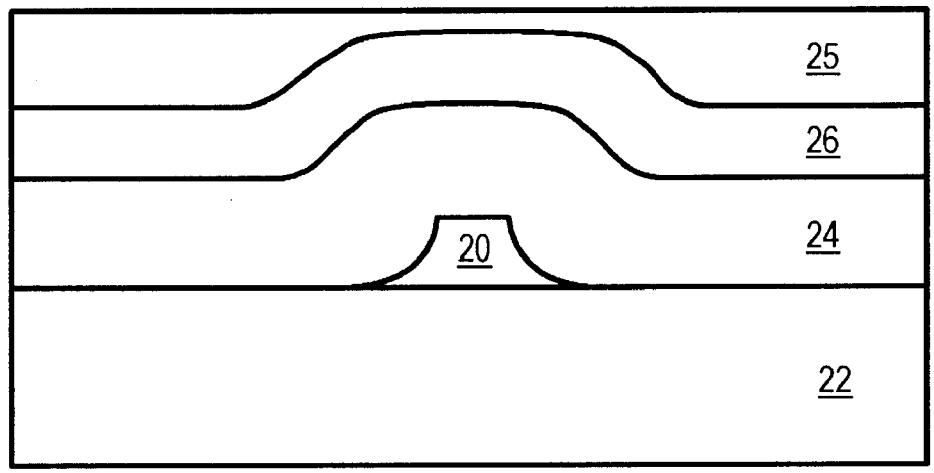
Figure 3G:
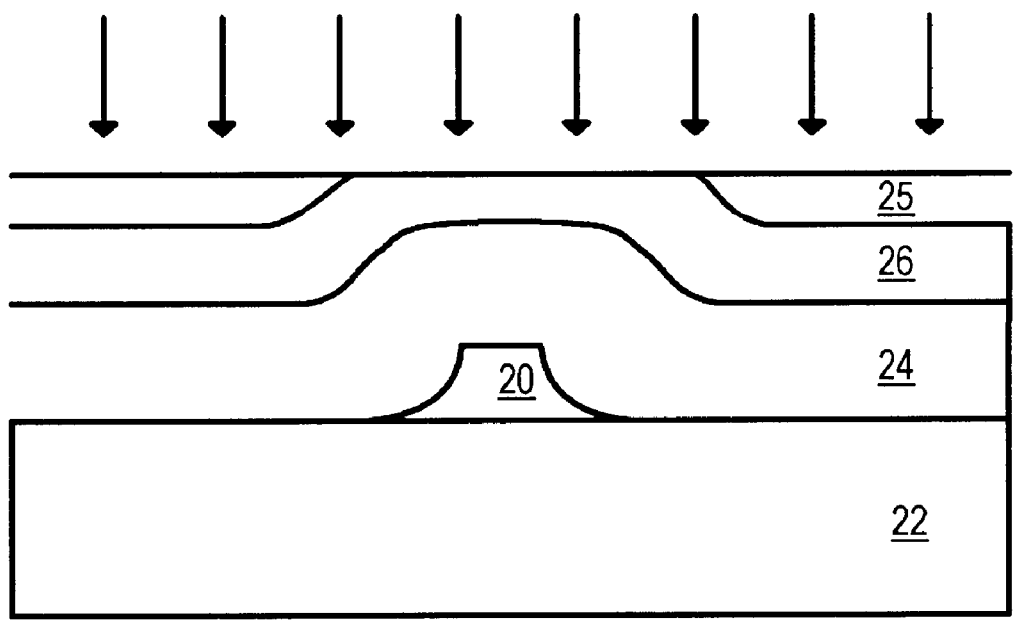
Figure 3H:
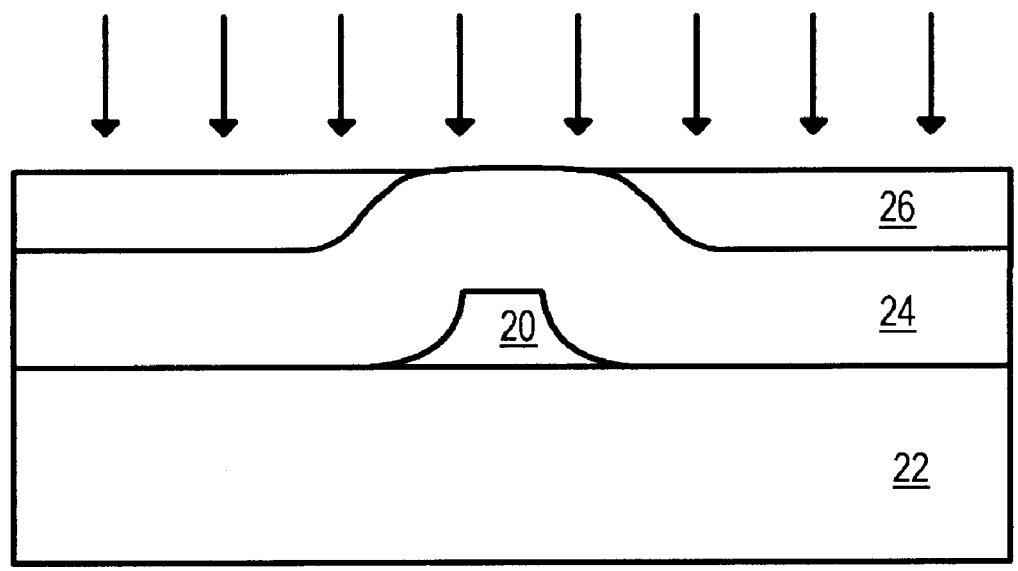
Figure 3I:
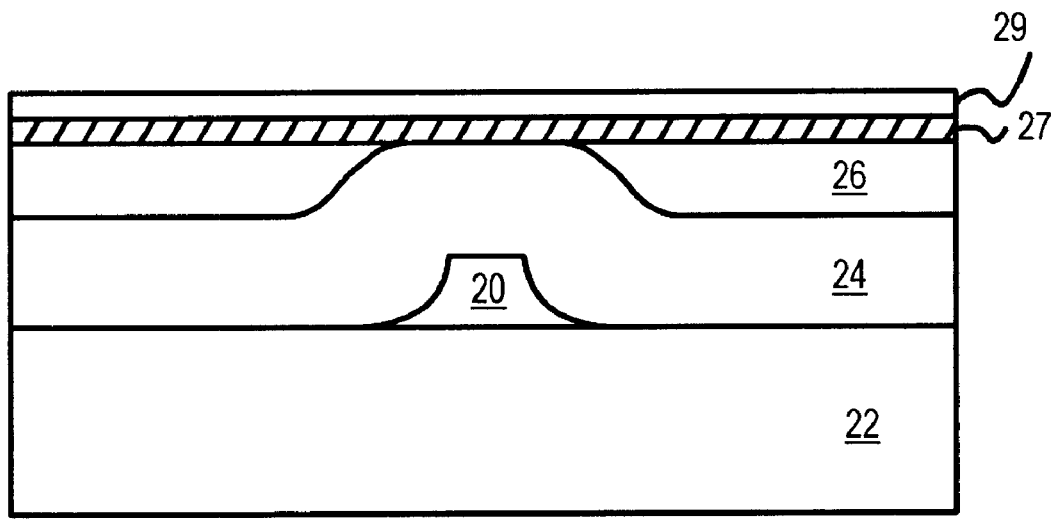
Figure 3J:
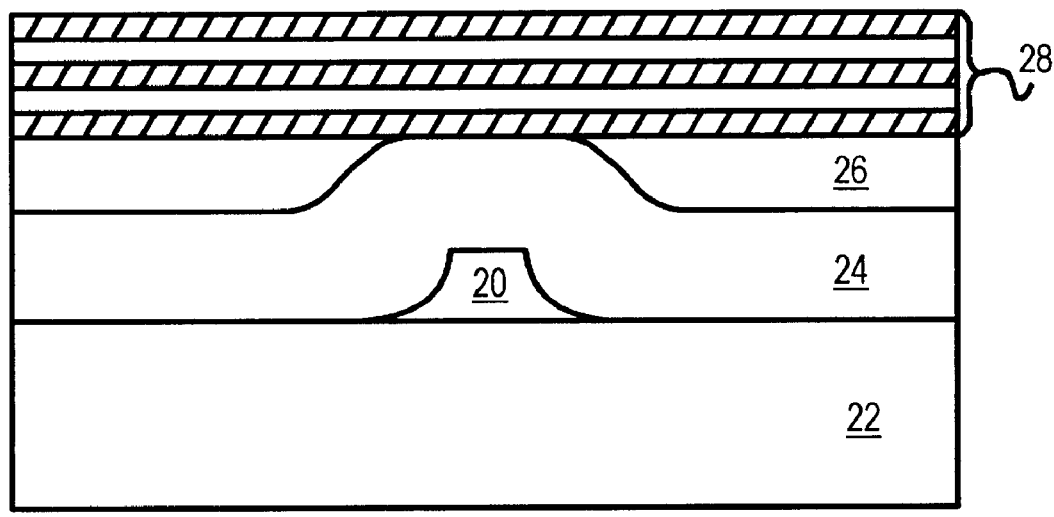
Figure 3K:
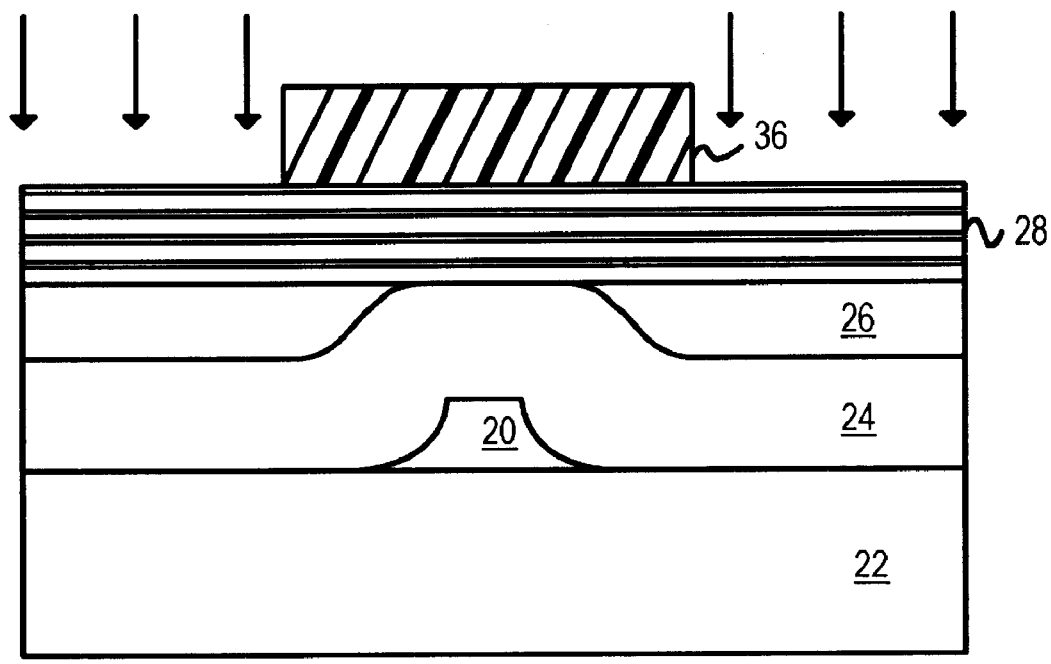
Figure 3L:
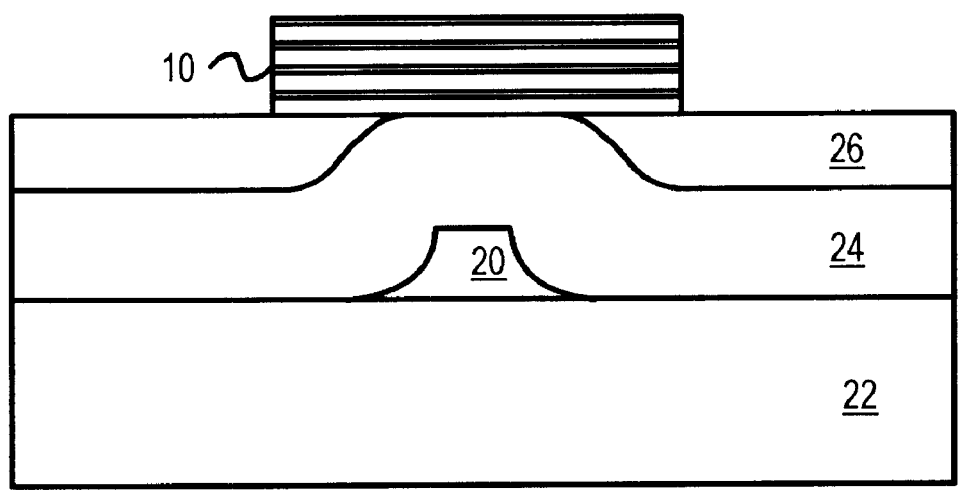
Figure 3M:
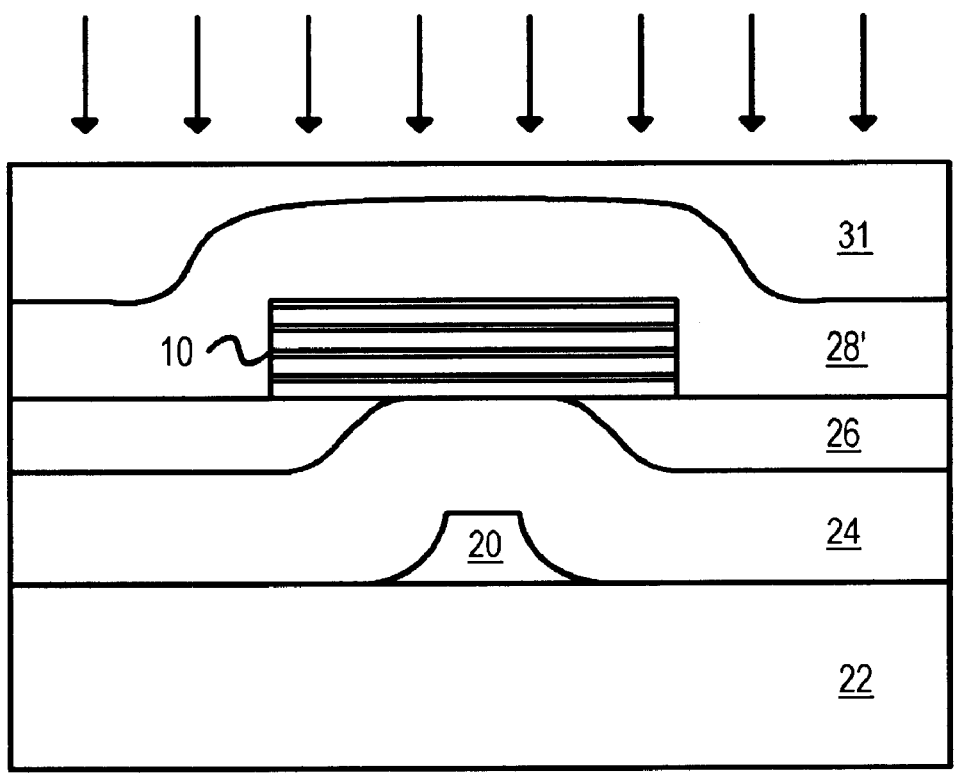
Figure 3N:
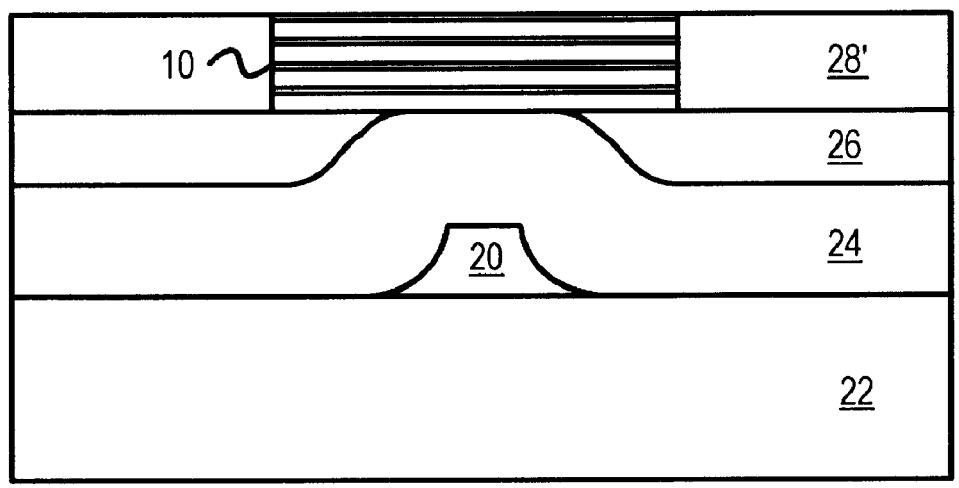
Figure 3O:
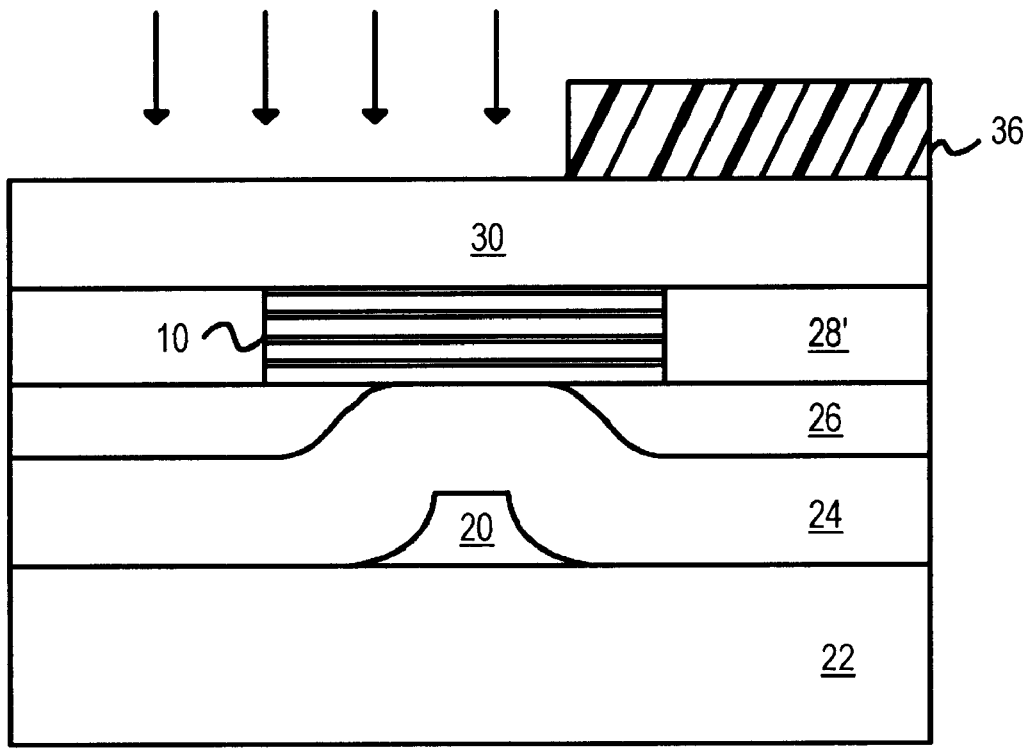
Figure 3P:
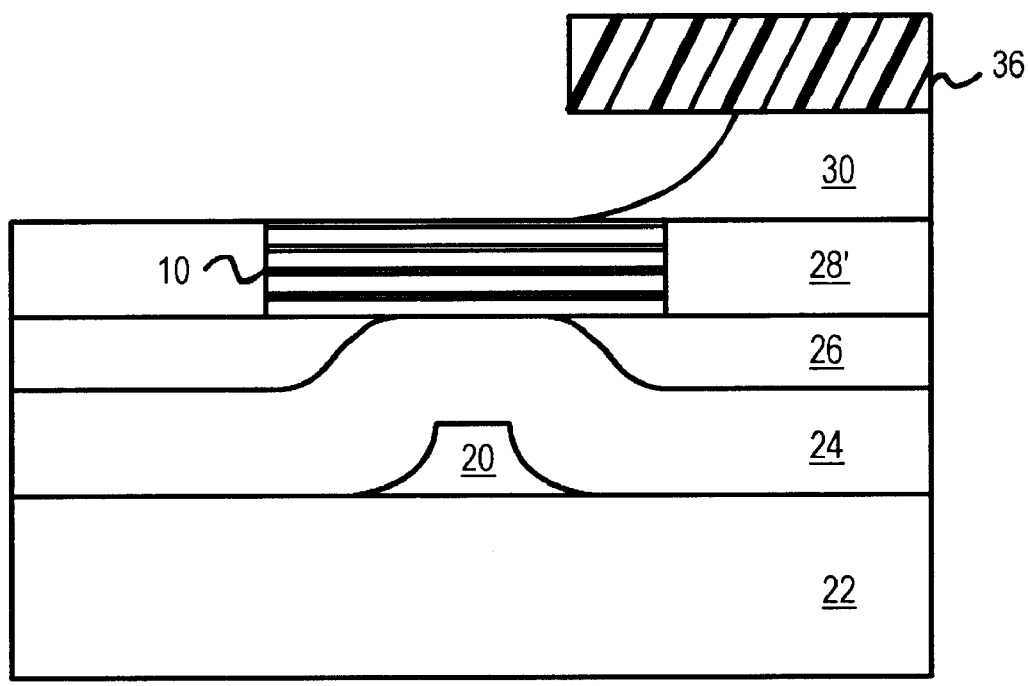
Figure 3Q:
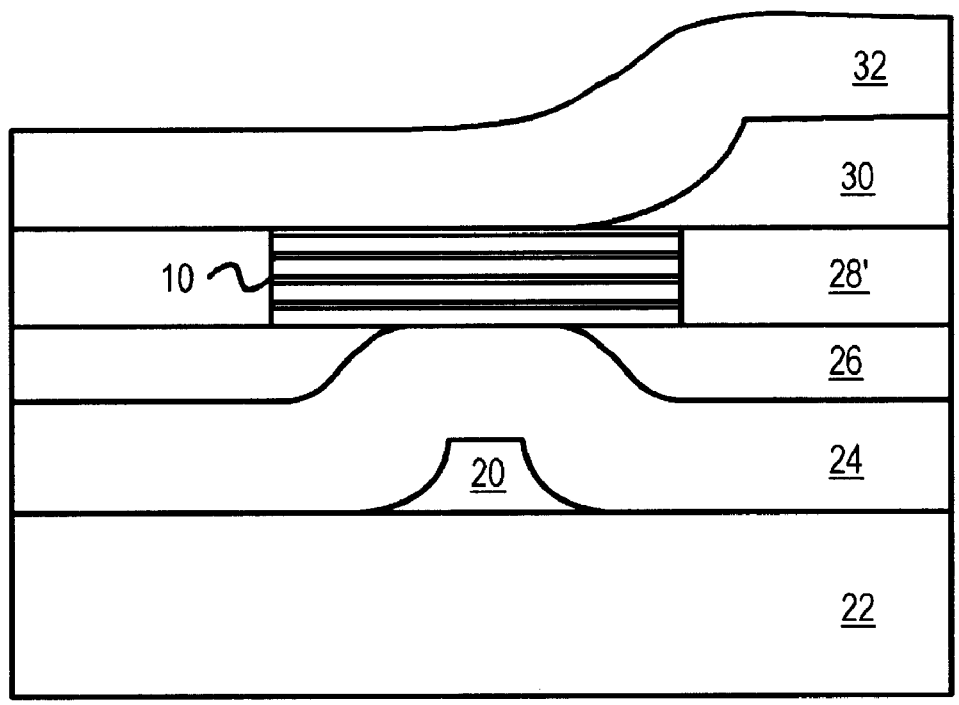
Figure 3R:
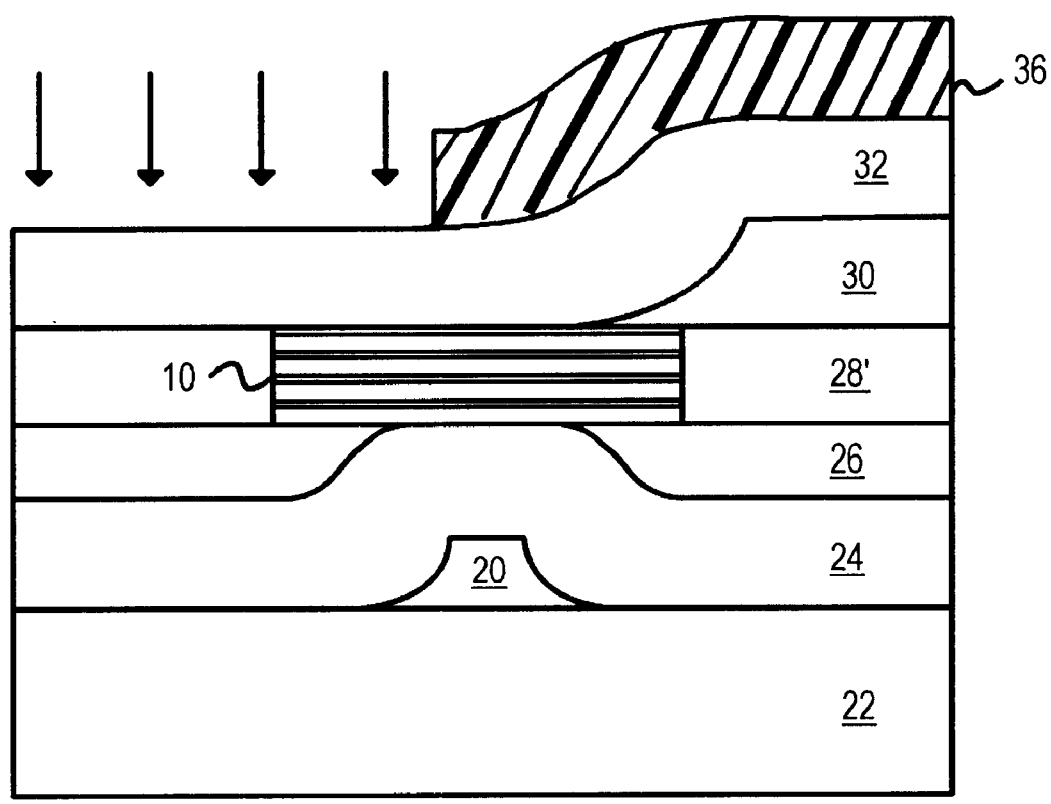
Figure 3S:
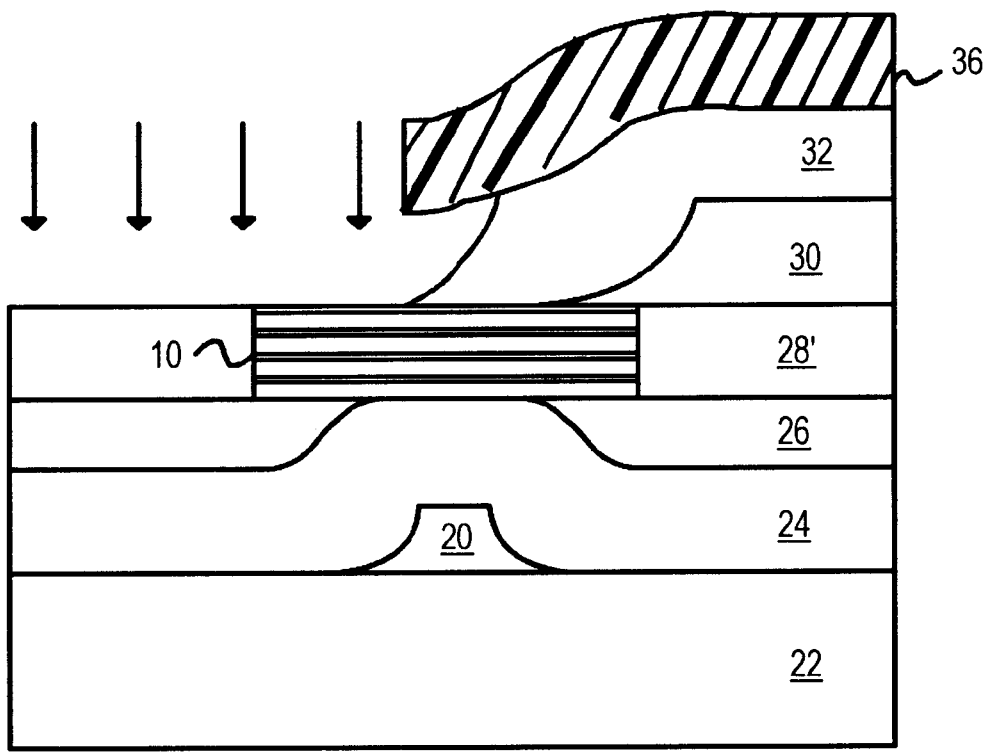
Figure 3T:
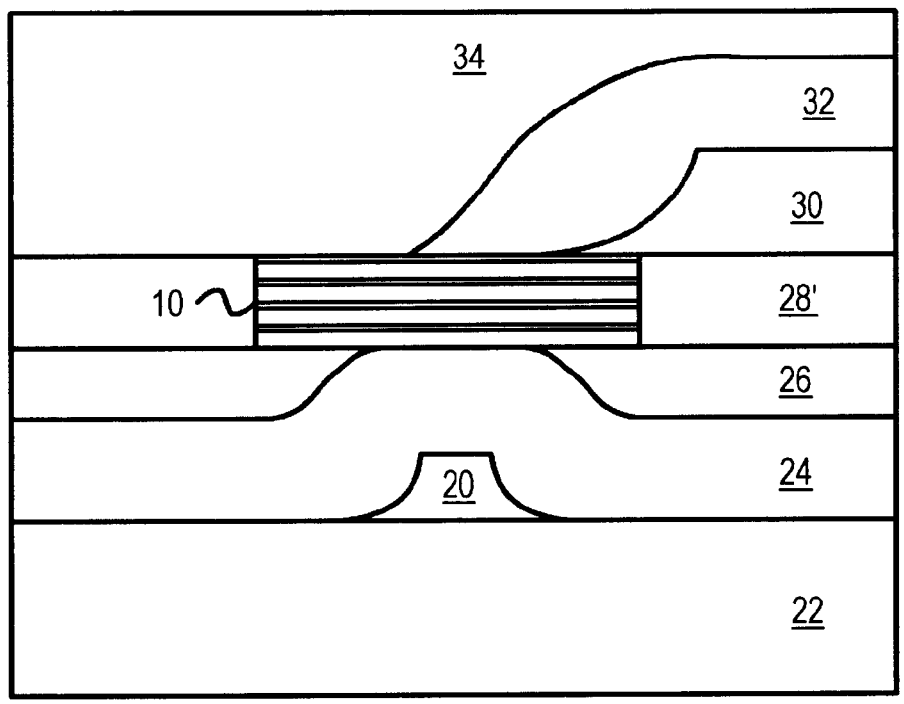

FIGS. 3A–T show cross-section diagrams of the integrated optical device at various steps in the manufacturing process. The actual manufacturing process used can vary from the example shown and described as many modifications and substitutions are possible.

In FIG. 3A, substrate 22 is a low-index material, or has a low-index layer (not shown) deposited or grown on its top surface. A low-index layer is deposited which is used to form bump 20. Mask 36 is deposited on top of the low-index layer and patterned and developed to form a pattern of bump 20. Mask 36 can be a photosensitive resin that is spun-on, exposed to light through a photomask, and developed. For example, the photo-resist resin molecules may form cross-links when exposed to UV light. Dipping in a solvent can wash away the unexposed resin, leaving mask 36. Positive as well as negative photo masking processes may be used. Direct writing by an electron beam or ion beam can eliminate the need for a photomask and exposure to light.

In FIG. 3B, the low-index layer is etched to form bump 20. An isotropic etch is used, such as a wet chemical etch, or a higher-pressure plasma etch. The low-index material is etched where mask 36 exposes the surface, and also underneath mask 36 where the etchant undercuts the edges of mask 36. As etching proceeds, more low-index material is removed at the top of the layer just under mask 36 than at the bottom of the low-index layer under mask 36.

The rounded concave profile shown in FIG. 3C is produced when etching ends and all of the low-index layer that is exposed by mask 36 is removed. The island of mask 36 can then be removed, such as by a chemical cleaning step. Bump 20 is left with its distinctive rounded shape formed by isotropic etching.

In FIG. 3D, a layer of high-index material is deposited over bump 20 and substrate 22 to form lower waveguide layer 24. A masking step (not shown) can be performed to pattern lower waveguide layer 24 into separate waveguides, such as lower-layer waveguides 16, 16', 16" of FIG. 2. FIG. 3E shows that low-index layer 26 is deposited over the patterned lower-level waveguides in lower waveguide layer 24.

In FIG. 3F, the top surface can be planarized by spinning on planarization layer 25. When spun on, layer 25 has a flat top surface, even when the underlying surface of low-index layer 26 is uneven as it passes over underlying features such as bump 20 and patterned waveguides in lower waveguide layer 24. Etching removes planarization layer 25 and low-index layer 26 at about the same rate, causing the surface to remain substantially planar as etching progresses as shown in FIG. 3G.

Once planarization layer 25 has been completely removed, the etch endpoint is reached. The endpoint can be detected by sampling the effluent gas removed by the vacuum pump from the low-pressure etch chamber. When the material that forms planarization 25 is no longer detected in the effluent, all of planarization layer 25 has been removed. The etch can continue for a short period of time after the endpoint is detected.

In FIG. 3H, some of lower waveguide layer 24 is preferably also removed over bump 20. This produces a flat, planar top surface with some of lower waveguide layer 24 exposed over bump 20, while the rest of lower waveguide layer 24 is covered by low index layer 26.

In FIG. 3I, the first 2 layers of the optical filter are deposited. Alternating layers of low and high index material are deposited. Ion-beam sputtering can be used to deposit the alternating filer layers 27, 29.

Lowest filter layer 27 can be a gradient-index (GRIN) layer that forms a lens, focusing the light from input waveguide 12 onto the bottom surface of filter 10. The index of refraction can have a gradient in it by gradually increasing or decreasing the partial pressure of a dopant or impurity that adjusts the refractive index. As the first layer 27 is deposited, the dopant is gradually increased (or decreased) to produce the gradient layer. The gradient index can also be produced using ion implantation or diffusion.

In FIG. 3J, additional alternating layers of high and low index material are sputter deposited, building up filter layer 28. The thicknesses of each layer are carefully controlled so that the filter has the desired optical properties, such as interference maxima and minima at desired wavelengths. The number of layers 27, 29 in filter layer 28 can vary, but as many as a 120 to 200 layers can be used.

In FIG. 3K, mask 36 is placed on the top of filter layer 28 and a pattern exposed and developed. An anisotropic etch can be used to etch the alternating layers in filter layer 28 to produce filter 10 as shown in FIG. 3L. Isotropic etching could also be used for this step as it is not a critical etch.

In FIG. 3M, low-index material is deposited over filter 10 as low-index layer 28'. Planarization layer 31 is applied over the surface of low-index layer 28'. Planarization layer 31 can be applied by spinning on to produce a relatively flat top surface despite underlying features such as filter 10. Planarization etch removes planarization layer 31 and part of low-index layer 28' that is above filter 10. FIG. 3N shows the result of this planarization. A relatively flat surface is provided by low-index layer 28', with the top of filter 10 exposed.

Low-index layer 30 is then deposited and masked, as shown in FIG. 3O. Mask 36 allows the unmasked areas of low-index layer 30 to be etched. An isotropic etch is performed so that mask 36 is undercut, produce the rounded profile shown in FIG. 3P. The profile can be adjusted by adjusting etch properties such as chemical concentrations, plasma power, and temperature. Mask 36 can then be removed.

In FIG. 3Q, high-index, upper waveguide layer 32 is deposited over filter 10 low-index layer 30 and the exposed parts of low-index layer 28'. Mask 36 is placed over areas where the upper-level waveguides are desired. FIG. 3R shows that high-index upper waveguide layer 32 is etched away between the desired waveguide areas.

FIG. 3S shows a rounded profile for upper waveguide layer 32 as it contacts filter 10. This profile results from a partially or fully isotropic etch that undercuts mask 36. The curvature of the resulting upper waveguide layer 32 yields a curved waveguide that bends light transmitted upward through filter 10 back to the plane of the upper-level waveguides of upper waveguide layer 32.

In FIG. 3T, the mask was removed and low-index layer 34 is applied. A separate low-index layer (not shown) could first be deposited over the waveguides of upper waveguide layer 32, which would not have a planar surface. Then a planar passivation layer could be deposited over the top surface to provide scratch resistance and sealing of the device from contaminants. The top surface need not be planar as shown in this embodiment.

When additional filter or waveguide layers are to be formed above upper waveguide layer 32, a planarization step can be performed as was shown in FIGS. 3M–N or FIGS. 3E–H. The planar surface can then be used to deposit a second filter layer and/or a third waveguide layer.

The resulting structure in FIG. 3T has input waveguide 12 as the left side of lower waveguide layer 24, and reflected-output waveguide 14 as the right side of lower waveguide layer 24. Bump 20 bends input light upward to strike the lower surface of filter 10. Some of the input light is transmitted through filter 10 and is collected by upper waveguide layer 32, which forms transmitted-output waveguide 16.

Isotropic or partially isotropic etching conditions provide rounded rather than sharp profiles for waveguides, allowing light to be bent upward to pass vertically through filter 10, and to be bent back into the horizontal planes of lower waveguide layer 24 and upper waveguide layer 32.

Figure 4:
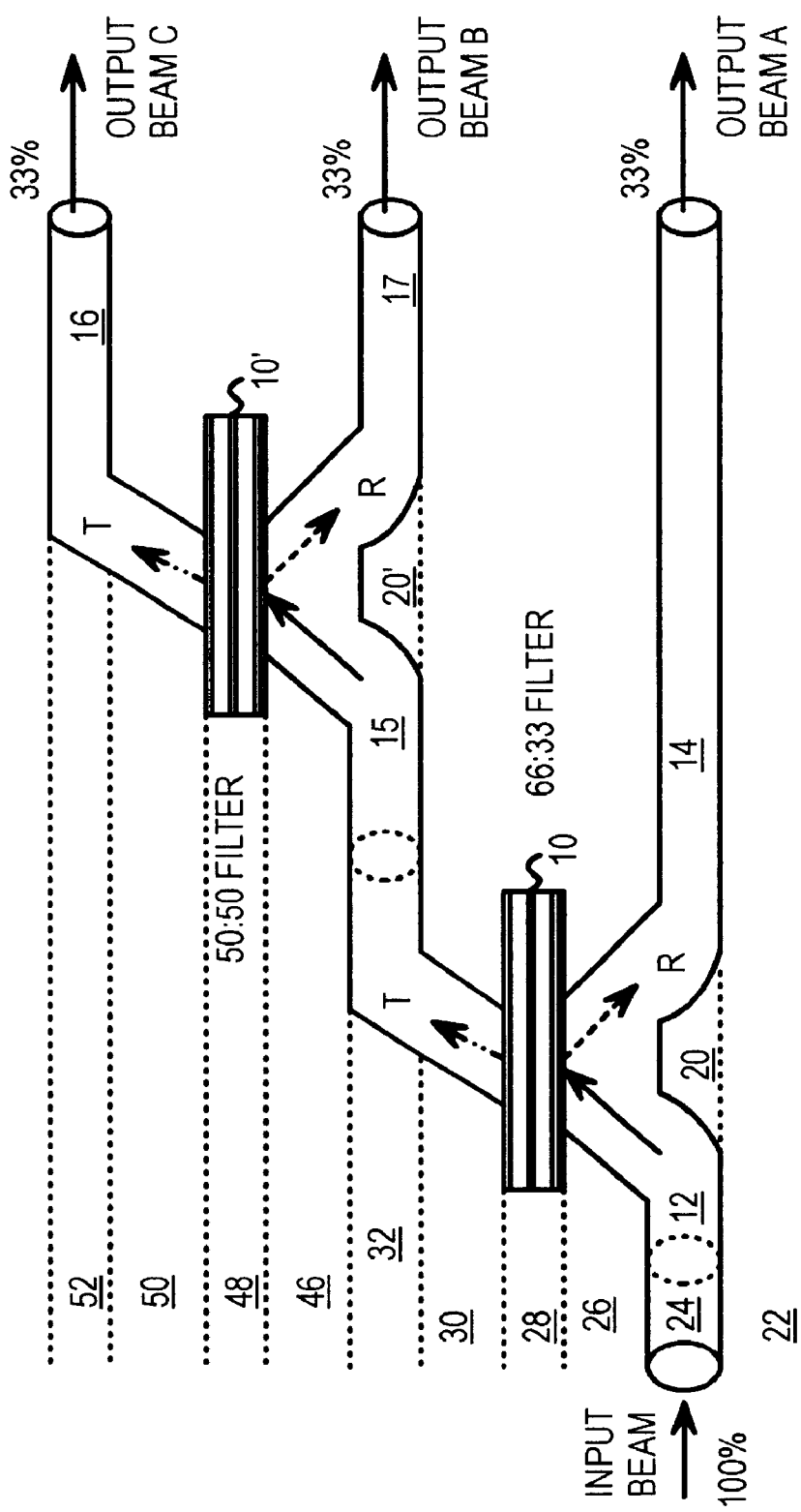
FIG. 4 shows a 1×3 integrated optical power coupler or splitter.

1×3 Optical Splitter—FIG. 4

FIG. 4 shows a 1×3 integrated optical power coupler or splitter. An input beam of light on input waveguide 12 is bent upward by bump 20 from the horizontal plane of lower waveguide layer 24 to filter 10. Some of this input light is reflected back down and bent back to the plane of lower waveguide layer 24 by bump 20 where it is collected by reflected-output waveguide 14 as output beam A.

Filter 10 is a 66:33 filter that reflects 33% of the input light, so output beam A has 33% of the power of the input beam. The light transmitted through filter 10 is collected by intermediate waveguide 15 and bent to the plane of upper waveguide layer 32. This intermediate beam transmitted from filter 10 is 66% of the input power.

Upper bump 20' bends the intermediate light from intermediate waveguide 15 upward to strike upper or second filter 10'. Second filter 10' is a 50:50 filter, so half of the light reaching second filter 10' is reflected back down to transmitted-reflected output waveguide 17. Upper or second bump 20' bends the reflected light back into the plane of upper waveguide layer 32, to output waveguide 17. Since half of the intermediate beam is reflected by second filter 10', or half of 66% of the input, transmitted-reflected output waveguide 17 output beam B has 33% of the input power.

Half of the intermediate beam is transmitted upward through second filter 10'. This transmitted light is bent back into the horizontal plane of third waveguide layer 52, where it is collected by transmitted-output waveguide 16. Since half of the intermediate beam is transmitted through second filter 10', or half of 66% of the input, transmitted-output waveguide 16 output beam C has 33% of the input power.

Filter 10 is made from filter layer 28, which can have different alternating film thicknesses than second filter 10', which is made from upper filter layer 48. The different alternating film thicknesses make filter 10' transmit 66% of the input light, while upper filter 10' transmits only 50% of its input light. Thus different filter layers can generate filters of different properties.

The waveguides of waveguide layers 24, 32, 52 are made of high-index material and are patterned to form a network of waveguides on each layer. These waveguides are surrounded by low-index material in low-index layers 26, 30, 46, 50, and a top low-index layer (not shown). These low-index layers are not flat, but can conform to underlying features such as waveguides and filters.

Planarization can be performed at several places in the process to provide a flat surface to support additional layers. For example, planarization can occur after filer layer 28, providing a flat surface between layers 28, 30. Another planarization can occur between upper filter layer 48 and low-index layer 50.

The angle that the input beam strikes filter 10 is important. A higher, more perpendicular angle is preferred since more of the light can be transmitted through the filter. Bump 20 determines the angle of incidence of the input light striking filter 10. Careful design of the profile of bump 20 can result in the desired angle, and some variation in the etch can be performed to reach the desired angle. The ratio of light transmitted and reflected is a function of the incident angle, wavelength, and thicknesses of filter layers, as well as temperature.

Figure 5:
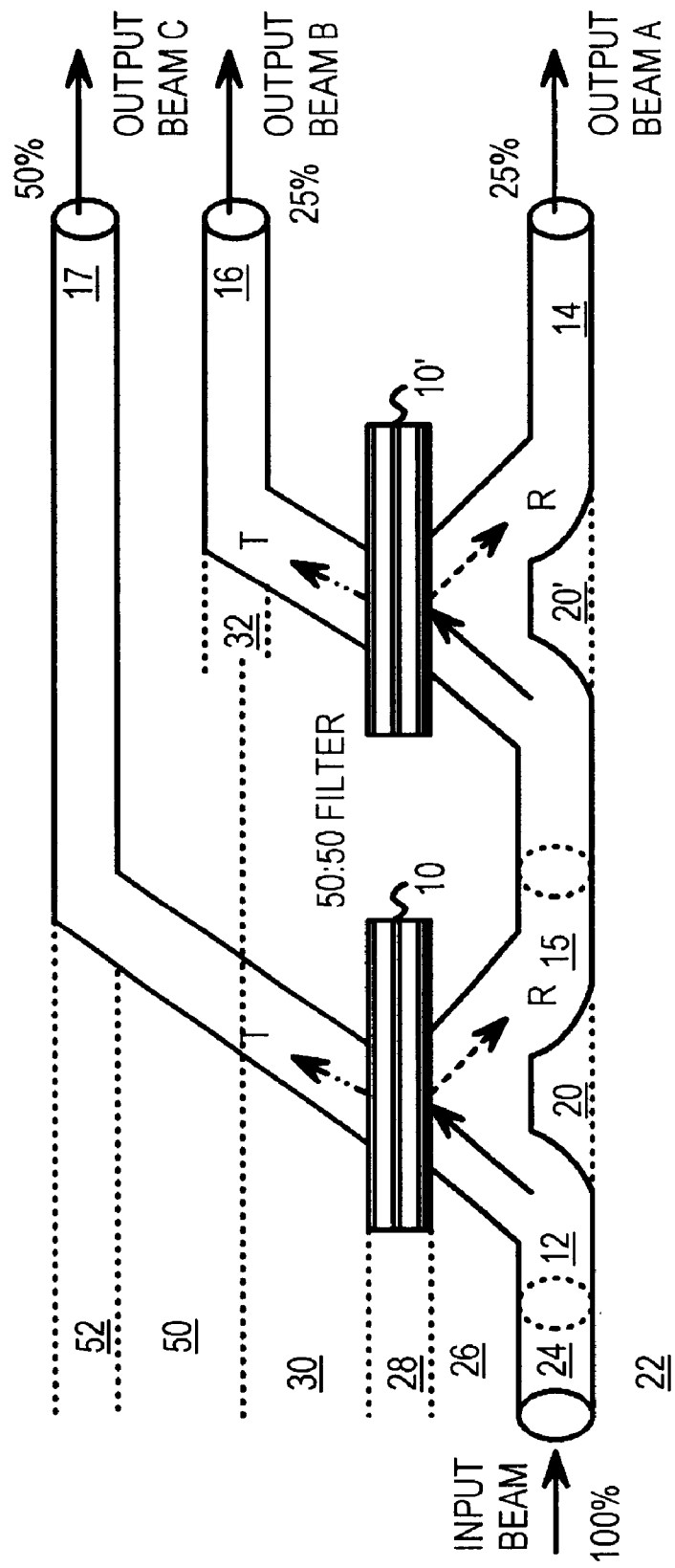
FIG. 5 is an integrated power coupler with several filters in a single filter layer.

Single-Filter-Layer Power Coupler—FIG. 5

FIG. 5 is an integrated power coupler with several filters in a single filter layer. Filter 10 and second filter 10' are made from the same filter layer 28. Filters 10, 10' are both 50:50 filters that transmit half of the incident light.

The input light from input waveguide 12 is deflected upward by bump 20 to strike filter 10. Half of the light is reflected by filter 10 downward and bent back into the plane of lower waveguide layer 24 by bump 20, where it is collected by intermediate waveguide 15.

The reflected light in intermediate waveguide 15 is deflected upward by second bump 20' and strikes second filter 10'. Half of the light is again reflected downward and bent by second bump 20' back into the plane of lower waveguide layer 24. The twice-reflected light is collected by transmitted-output waveguide 16 and output as output beam A. Since half of the input light was reflected by filter 10, and half of the reflected light in intermediate waveguide 15 was reflected by second filter 10, output beam A has 25% of the input beam power.

The light transmitted upward through second filter 10' is bent into the plane of upper waveguide layer 32 and output by transmitted-output waveguide 16. Since second filter 10' transmits half of its input, from intermediate waveguide 15, output beam B also has 25% of the input power.

The light transmitted upward through filter 10 is bent into the plane of third waveguide layer 52 and output by transmitted-output waveguide 17. Since filter 10 transmits half of its input, output beam C has 50% of the input power.

The connection from filter 10 to third waveguide layer 52 can be made by etching a hole through low-index layers 30, 50 after upper waveguide layer 32 has been deposited and etched. The process steps are similar to that shown in FIGS. 3O–T, except that a deeper step is cut to filter 10. Enough spacing can be provided between filters 10, 10' to prevent underlying features and waveguides near second filter 10' from distorting the area around filter 10.

The input light is thus split 50%-25%-25% among output beams C, B, A. A three-way, non-symmetric optical power splitter is produced. Of course, other split percentages could be produced by changing the transmittance of filter layer 28.

50:25:25 Splitter Using 2 Waveguide Layers—FIGS. 6A–B

Rather than use third waveguide layer 52, output C can be routed on upper waveguide layer 32. FIGS. 6A–B show an integrated optical power coupler that uses two waveguide layers and one filter layer. Light can be bent to the side by the waveguides and still be within the plane of upper waveguide layer 32.

In the side view shown in FIG. 6A, input light from input waveguide 12 is deflected upward to filter 10 by bump 20. Light transmitted through filter 10 is collected by transmitted-output waveguide 16, which is formed on upper waveguide layer 32. Filter 10 is a 50:50 filter, so output beam C on transmitted-output waveguide 16 is 50% power.

Light reflected downward from filter 10 is bent back into the plane of lower waveguide layer 24 and collected by intermediate waveguide 15. Second bump 20' again deflects the light upward to second filter 10'. Light reflected from second filter 10' is bent back into the plane of lower waveguide layer 24 by second bump 20' and collected by reflected-output waveguide 14 as output beam A.

Second filter 10' is made from the same alternating-layers material in filter layer 28 as filter 10, so it also is a 50:50 filter. Output beam A from reflected-output waveguide 14 has half the power of the reflected beam in intermediate waveguide 15, so output beam A has 25% power.

Light transmitted upward through second filter 10' is bent into the horizontal plane of upper waveguide layer 32 and output as output beam B in waveguide 17. This is also a 25% power output, since the power was attenuated by filter 10 and second filter 10', both 50:50 filters.

The top view in FIG. 6B shows that transmitted-output waveguide 16 from filter 10 bends the light to the side to avoid the area near second filter 10'. Transmitted-output waveguide 16 is in the same upper waveguide layer 32 as output waveguide 17 from second filter 10'. However, the lateral spacing allows both waveguides to exist on the same upper waveguide layer 32. Waveguides in lower waveguide layer 24 could also bend within the horizontal plane of upper waveguide layer 32. Other waveguides (not shown) could also exist in lower waveguide layer 24 and upper waveguide layer 32 by being laterally spaced from the waveguides shown.

Figure 7:
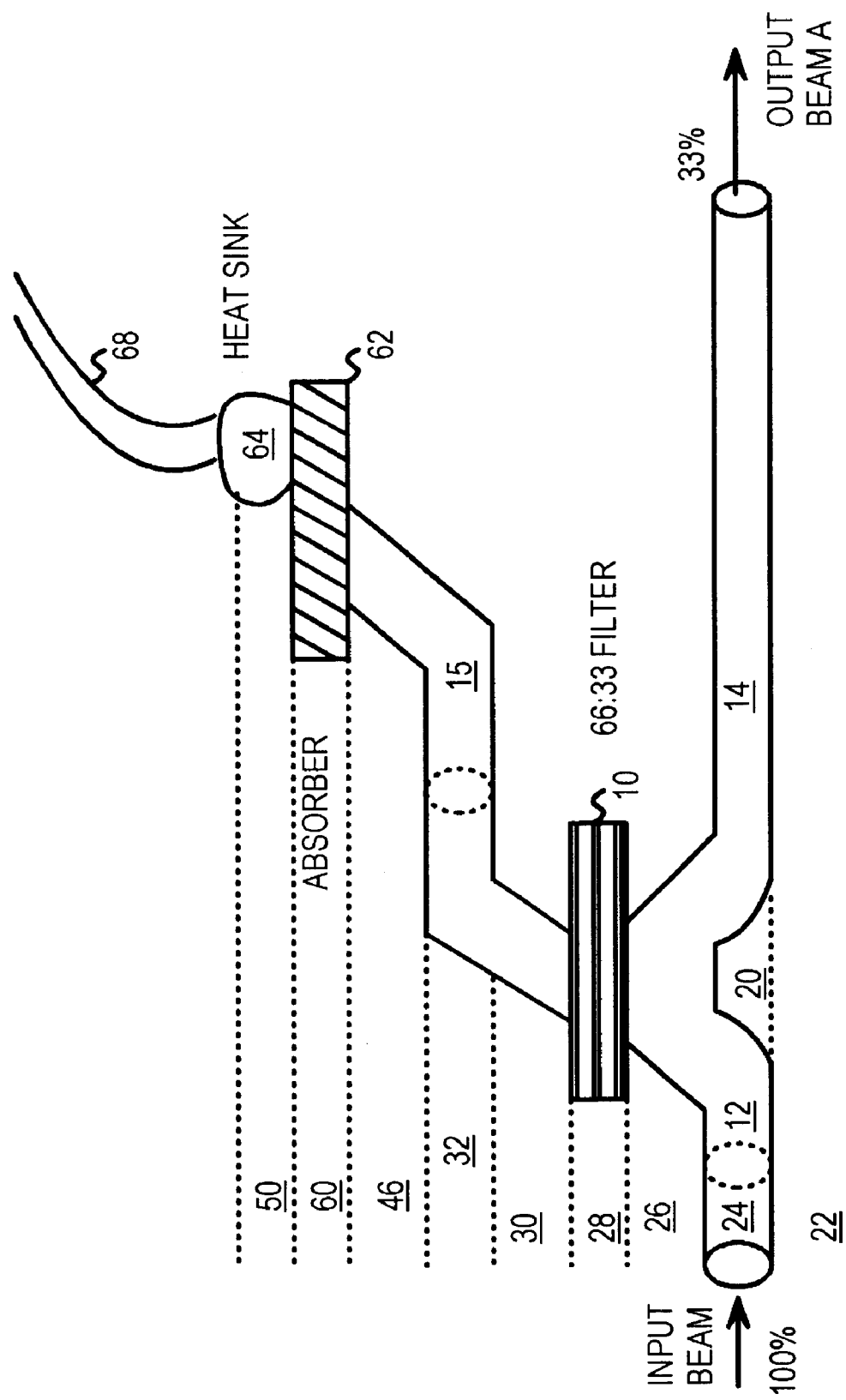
FIG. 7 is an integrated optical attenuator with a heat sink for an optical absorber.

Many optical devices can be integrated together on the same substrate. Alternatively, many optical devices can be formed together on the same substrate, and then separated into separate optical devices:

Integrated Optical Attenuator Uses Heat Sink—FIG. 7

FIG. 7 is an integrated optical attenuator with a heat sink for an optical absorber. The input bean from input waveguide 12 is deflected upward by bump 20 to filter 10. Filter 10 is a 66:33 filter that reflects one-third of the input power downward to reflected-output waveguide 14. Waveguides 12, 14 are formed on lower waveguide layer 24.

Two-thirds of the input power are transmitted upward through filter 10 to intermediate waveguide 15. The transmitted light travels horizontally on upper waveguide layer 32 through intermediate waveguide 15. The light is then deflected upward to optical absorber 62 where the light is absorbed. A half-bump can be used to deflect the light upward. The waveguide on upper waveguide layer 32 ends at the top of such a half-bump so that all light strikes optical absorber 62. The optical absorber can be a zinc-doped waveguide, or a material with an anti-reflective coating.

The absorbed light produces heat. Heat sink 64 is attached to optical absorber 62, either directly on top as shown, or to the side through an extension (not shown) of optical absorber 62 in absorber layer 60. Heat sink 64 can be a metal layer such as a deposited aluminum bonding pad that can be solder-bonded to heat-conducting wire 68 to remove the heat from the integrated optical device.

Low-index layers 50, 46, 30, 26 do not conduct heat, so the heat from optical absorber 62 is conducted away through heat sink 64 and heat-conducting wire 68. The power of output beam A is attenuated by 66% from the input beam's power. Using heat sink 64 allows for tight integration with other optical components that may otherwise be affected by a temperature rise from optical absorber 62.

ALTERNATE EMBODIMENTS

Several other embodiments are contemplated by the inventors. For example the process techniques used to create the various filters, waveguides and beam-deflectors can be combined in several ways to produce a variety of optical devices. Complex optical networks of couplers, absorbers, and waveguides could be created on the same substrate as a large integrated optical device. Alternately, an optical power splitter or attenuator can be constructed using optical fibers and a stand-alone filter.

The deflecting bump could have a flat top as shown, or the mask could be small and the etch undercut large so that the bump has a more rounded or pointed top. While the terms horizontal and vertical have been used for illustrative purposes, the light striking the filter can be at an angle from a true perpendicular to the plane of the lower waveguide layer and still pass through the filter vertically. Likewise, the plane of the lower waveguide layer or upper waveguide layer contains non-planar rises over the deflecting bumps, yet the light still travels in a predominantly horizontal plane.

A GRIN lens could also be added to the upper-most layer of the filter to focus light exiting the filter and into the transmitted-output waveguide. Other kinds of beam concentrators could be used. Optical inputs can be received from optical fibers by providing V-shaped grooves at the edges of the integrated device. Upper layers of low-index material can be etched away to expose the underlying waveguide, and a V-groove can be cut in the exposed waveguide near the device edge. The fibers are placed in the V-grooves which align them to the integrated waveguides. Outputs can also be provided to fibers using such V-grooves to align fiber to the integrated output waveguides. Other connection techniques could also be used.

The high-index layer can be Galium-Arsenide GaAs, while the low-index material can be Alimunum-Galium-Arsinide AlGaAs. Other materials could also be used, and the exact doping and crystal or poly-crystal properties can be adjusted. The iostropic etch can be produced by a dry (plasma) etch with a higher pressure and temperature to reduce the free-path length of travel by an atom or ion in the plasma to allow more undercutting. A wet etch such as C2H6O6 and H2O2 (Oxalic (Ethanedionic) acid dehydrate and peroxide) or some other wet chemical etch can also be used.

The sharp change in the index of refraction at the boundary between the low and high index materials causes light to reflect back into the waveguide. The low-index or high-index material may be grown rather than deposited. The optical absorber could be made from a carbon-carbon composite, a zinc-doped semiconductor material, or other optically-absorbing material.

The power coupler of FIG. 4 could be modified to be a wavelength de-multiplexer. For example, filter 10 could be a wavelength-dependent filter that blocks or reflects wavelength λ1, but passes other wavelengths. Upper or second filter 10' could block and reflect wavelength λ2, but pass wavelength λ3. Then output beam A outputs wavelength λ1, output beam B outputs λ2, while output beam C outputs λ3. Thus an input beam of three wavelengths λ1, λ2, λ3 is de-multiplexed into three separate beams of the three wavelengths.

The filter layer does not have to be patterned, but could be a continuous filter layer. Sufficient spacing between filter regions over bumps could be provided to reduce optical cross-talk through the filter region. This could reduce processing cost and Complexity by eliminating the patterning and planarization steps of FIGS. 3K–N. Alternately, some adjacent filters could be patterned together, such as filters 10, 10' of FIGS. 7A–B.

The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. 37 C.F.R. §1.72(b). Any advantages and benefits described may not apply to all embodiments of the invention. When the word "means" is recited in a claim element, Applicant intends for the claim element to fall under 35 USC §112, paragraph 6. Often a label of one or more words precedes the word "means". The word or words preceding the word "means" is a label intended to ease referencing of claims elements and is not intended to convey a structural limitation. Such means-plus-function claims are intended to cover not only the structures described herein for performing the function and their structural equivalents, but also equivalent structures. For example, although a nail and a screw have different structures, they are equivalent structures since they both perform the function of fastening. Claims that do not use the word means are not intended to fall under 35 USC §112, paragraph 6. Signals are typically electronic signals, but may be optical signals such as can be carried over a fiber optic line.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A three-dimensional integrated optical network comprising:

a substrate having a top surface;

a lower waveguide layer, formed above the substrate, containing optical waveguides in a lower plane substantially parallel to the top surface;

a deflecting bump, formed above the substrate and formed in the lower plane of the lower waveguide layer, the deflecting bump formed before the lower waveguide layer is formed, the lower waveguide layer bending upward over the deflecting bump;

a filter, formed over the deflecting bump, the filter receiving incident light from the lower waveguide layer that is deflected upward out of the lower plane by the deflecting bump, the filter reflecting a reflected portion of the incident light back down to the deflecting bump which bends the reflected portion back into a waveguide in the lower plane of the lower waveguide layer; and an upper waveguide layer containing optical waveguides in an upper plane that is above and substantially parallel to the lower plane and the top surface;

wherein the filter transmits a transmitted portion of the incident light, the transmitted portion of light being transmitted upward through the filter and bent into the upper plane by a waveguide from the upper waveguide layer that contacts the filter, whereby the filter receives light deflected upward from the lower waveguide layer by the deflecting bump, the filter transmitting light upward to the upper waveguide layer and reflecting light back downward to the lower waveguide layer.

2. The three-dimensional integrated optical network of claim 1 wherein the deflecting bump is has a curved vertical profile that is produced by etching with at least a partially isotropic etch that undercuts a mask that defines the deflecting bump, the lower waveguide layer formed over the deflecting bump so that the lower waveguide layer curves upward above the lower plane to contact a lower surface of the filter above the deflecting bump, whereby the lower waveguide layer contacts the filter above the deflecting bump with the curved vertical profile.

3. The three-dimensional integrated optical network of claim 2 wherein the filter is formed by repeatedly and alternately depositing a first film with a first index of refraction and a second film with a second index of refraction to form a stack of alternating first and second films, wherein the first index of refraction does not equal the second index of refraction, whereby the filter is an alternating stack of thin films.

4. The three-dimensional integrated optical network of claim 3 wherein the filter includes a gradient film with a gradient index of refraction, an index of refraction increasing or decreasing with distance above the top surface, wherein the gradient film acts as a gradient-index lens to focus light for the filter.

5. The three-dimensional integrated optical network of claim 4 wherein the gradient film is formed below the filter but above the lower waveguide layer, or is formed above the filter but below the upper waveguide layer.

6. The three-dimensional integrated optical network of claim 2 wherein the waveguide from the upper waveguide layer contacts the filter through an upper opening in an upper isolating layer above the filter layer but below the upper waveguide layer, wherein the upper opening has a curved vertical profile produced by etching with at least a partially isotropic etch that undercuts a mask that defines the upper opening, the upper waveguide layer formed over the upper opening and the upper isolating layer so that the upper waveguide layer curves downward below the upper plane to contact a top surface of the filter through the upper opening, whereby the upper waveguide layer contacts the filter through the upper opening with the curved vertical profile.

7. The three-dimensional integrated optical network of claim 6 wherein the incident light travels to the filter in an input waveguide in the lower waveguide layer, while the reflected portion of light travels away from the filter in a reflected-output waveguide in the lower waveguide layer, while the transmitted portion of light travels away from the filter in a transmitted-output waveguide in the upper waveguide layer.

8. The three-dimensional integrated optical network of claim 7 wherein the lower waveguide layer is patterned to include other waveguides besides the input waveguide and the reflected-output waveguide;

wherein the upper waveguide layer is patterned to include other waveguides besides the transmitted-output waveguide, whereby the lower waveguide layer and upper waveguide layer contain a network of waveguides.

9. The three-dimensional integrated optical network of claim 8 further comprising:

a second deflecting bump formed above the substrate and formed in the lower plane of the lower waveguide layer, the second deflecting bump formed before the lower waveguide layer is formed, the waveguide layer bending upward over the second deflecting bump;

a second input waveguide and a second reflected-output waveguide in the lower waveguide layer;

a second transmitted-output waveguide in the upper waveguide layer;

a second filter formed in a filter layer that contains the filter, the second filter being formed over the second deflecting bump, the second filter receiving light from the second input waveguide in the lower waveguide layer and reflecting light to the second reflected-output waveguide in the lower waveguide layer and transmitting light upward to the second transmitted-output waveguide in the upper waveguide layer, whereby at least two filters are integrated on the substrate using the lower waveguide layer and the upper waveguide layer to route light.

10. The three-dimensional integrated optical network of claim 9 wherein the reflected-output waveguide is a same waveguide as the second input waveguide;

whereby the second filter receives light reflected from the filter, and whereby the second reflected-output waveguide and the second transmitted-output waveguide output light that is filtered twice.

11. The three-dimensional integrated optical network of claim 9 further comprising:

a third input waveguide and a third reflected-output waveguide in the upper waveguide layer;

a third transmitted-output waveguide in the lower waveguide layer;

a third filter formed in the filter layer, the third filter receiving light from the third input waveguide in the upper waveguide layer and reflecting light to the third reflected-output waveguide in the upper waveguide layer and transmitting light downward to the third transmitted-output waveguide in the lower waveguide layer, whereby light is transmitted downward through the third filter but upward through the filter and the second filter.

12. The three-dimensional integrated optical network of claim 11 wherein the lower waveguide layer and the upper waveguide layer are formed from a high-refractive-index material and are surrounded by isolating layers formed from a low-refractive-index material;

wherein the deflecting bump is formed from the low-refractive-index material.

13. The three-dimensional integrated optical network of claim 12 further comprising:

an optical absorber, coupled to receive light from a waveguide in the upper waveguide layer, the optical absorber absorbing the light and generating heat; and a heat sink, attached to the optical absorber, for drawing heat away from the optical absorber, whereby light is absorbed and generated heat removed.

14. An integrated multi-layer optical device comprising:

input waveguide means, formed using a first waveguide layer of optical conducting material, for conducting an input beam of light in a horizontal direction;

deflect means, formed from an optical isolator material, for deflecting light in the input waveguide means to a vertical direction from the horizontal direction;

filter means, receiving light from the input waveguide means that is deflected to the vertical direction by the deflect means, for reflecting a reflected portion of received light and for vertically transmitting a transmitted portion of received light;

reflected-output waveguide means, formed using the first waveguide layer, for conducting the reflected portion of received light collected from the filter means; and transmitted-output waveguide means, formed using a second waveguide layer, for conducting the transmitted portion of received light vertically transmitted through the filter means, whereby the input beam is vertically transmitted through the filter means to the second waveguide layer and reflected to the first waveguide layer.

15. The integrated multi-layer optical device of claim 14 further comprising:

second deflect means, formed from the optical isolator material, for deflecting light to a vertical direction from the horizontal direction;

second filter means, receiving light deflected by the second deflect means from the reflected-output waveguide means or from another waveguide in the first waveguide layer, for reflecting a second reflected portion of received light and for vertically transmitting a second transmitted portion of received light;

second reflected-output waveguide means, formed using the first waveguide layer, for conducting the second reflected portion of received light collected from the second filter means; and second transmitted-output waveguide means, formed using the second waveguide layer, for conducting the second transmitted portion of received light vertically transmitted through the second filter means, whereby at least two filters are integrated on the integrated multi-layer optical device.

16. The integrated multi-layer optical device of claim 15 wherein the second filter means is formed from a same filter layer as the filter means.

17. The integrated multi-layer optical device of claim 14 further comprising:

second deflect means, formed from the optical isolator material, for deflecting light to a vertical direction from the horizontal direction, the second deflect means formed in a plane of the second waveguide layer;

second filter means, receiving light deflected by the second deflect means from the transmitted-output waveguide means or from another waveguide in the second waveguide layer, for reflecting a second reflected portion of received light and for vertically transmitting a second transmitted portion of received light;

second reflected-output waveguide means, formed using the second waveguide layer, for conducting the second reflected portion of received light collected from the second filter means; and second transmitted-output waveguide means, formed using a third waveguide layer, for conducting the second transmitted portion of received light vertically transmitted through the second filter means, whereby at least two filters and three waveguide layers are integrated on the integrated multi-layer optical device.

18. A multi-layer optical coupler comprising:

a substrate for supporting the multi-layer optical coupler;

a bump formed on the substrate, with a curved edge for guiding light from a first horizontal plane to an upward direction;

an input waveguide formed by patterning a lower waveguide layer of high-refractive index material, the input waveguide guiding light in the first horizontal plane to the bump and guiding light up over the bump;

a reflected-output waveguide formed by patterning of the lower waveguide layer, the reflected-output waveguide collecting light reflected downward near the bump and guiding light in the first horizontal plane;

a first low-refractive-index layer, formed over lower waveguides formed by patterning the lower waveguide layer and formed over the substrate between the lower waveguides that include the input waveguide and the reflected-output waveguide;

wherein a top surface of the first low-refractive-index layer is planarized to have a substantially flat top surface, the first low-refractive-index layer having a first opening over the bump that exposes the input waveguide and the reflected-output waveguide over the bump;

a filter formed over the first opening and contacting the input waveguide and the reflected-output waveguide over the bump, the filter upwardly transmitting a transmitted portion of light and downwardly reflecting a reflected portion of light;

a second low-refractive-index layer, formed over the filter and over the first low-refractive-index layer, having a second opening over a portion of a top surface of the filter; and a transmitted-output waveguide formed by patterning an upper waveguide layer of high-refractive index material, the transmitted-output waveguide guiding light in a second horizontal plane that is parallel to and above the first horizontal plane;

wherein the transmitted-output waveguide includes a portion that descends below the second horizontal plane through the second opening to contact the top surface of the filter;

wherein the transmitted-output waveguide receives the transmitted portion of light transmitted upwardly through the filter, the transmitted-output waveguide bending the transmitted portion of light into the second horizontal plane;

whereby light is guided from the first horizontal plane of waveguides upwardly to the filter and transmitted through the filter to the second horizontal plane of waveguides and reflected downwardly to the first horizontal plane of waveguides.

19. The multi-layer optical coupler of claim 18 wherein the bump has a second curved edge for guiding reflected light from the filter to the reflected-output waveguide in the first horizontal plane.

20. The multi-layer optical coupler of claim 19 further comprising:

additional bumps formed on the substrate;

additional filters formed in a filter layer that includes the filter, the additional filters formed over the additional bumps formed on the substrate;

wherein waveguides in the lower waveguide layer make contact with the additional filters through additional openings in the first low-refractive-index layer under the additional filters;

wherein waveguides in the upper waveguide layer make contact with top surfaces of the additional filters through additional openings in the second low-refractive-index layer above the additional filters, whereby a network of the additional filters and waveguides is integrated on the substrate.

* * * * *